Aug. 4, 1925.
W. E. TORFS
1,548,070
COMBINED TYPEWRITING AND COMPUTING MACHINE
Filed March 13, 1923
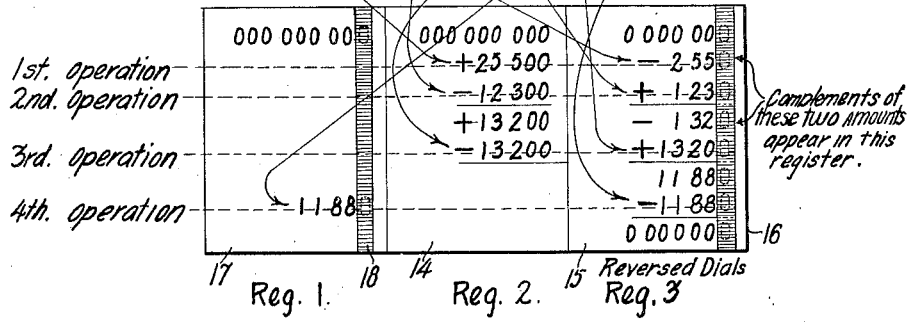
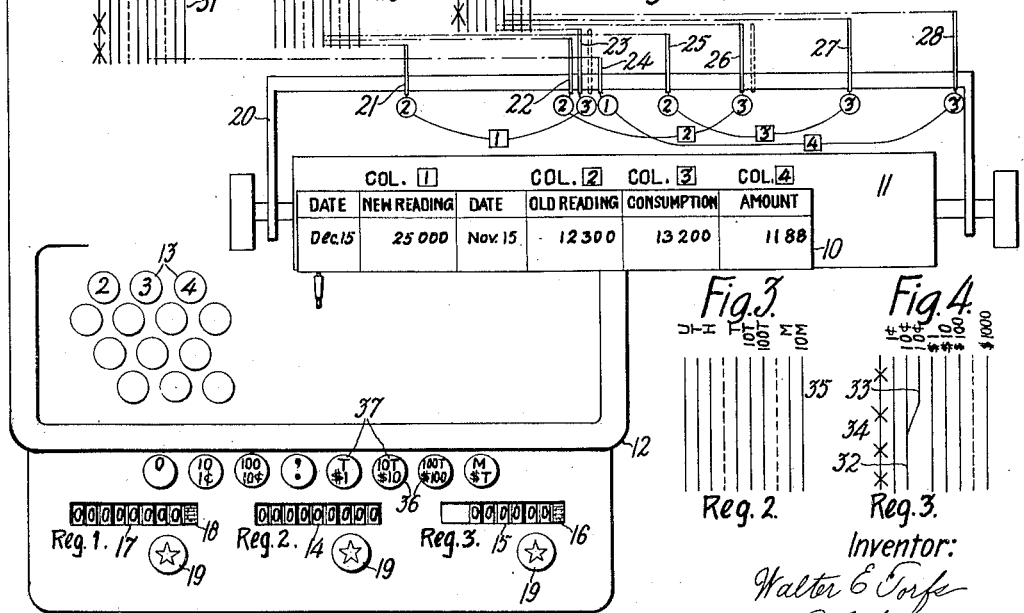
Inventor:
Walter E. Torfs
by B. C. Stickney
Attorney Patented Aug. 4, 1925.

1,548,070

UNITED STATES PATENT OFFICE.

WALTER E. TORFS, OF JERSEY CITY, NEW JERSEY, ASSIGNOR TO UNDERWOOD TYPEWRITER COMPANY, OF NEW YORK, N. Y., A CORPORATION OF DELAWARE.

COMBINED TYPEWRITING AND COMPUTING MACHINE.

Application filed March 13, 1923. Serial No. 624,689.

*To all whom it may concern:*

Be it known that I, WALTER E. TORFS, a citizen of the United States, residing in Jersey City, in the county of Hudson and State of New Jersey, have invented certain new and useful Improvements in Combined Typewriting and Computing Machines, of which the following is a specification.

This invention relates to performing certain multiplication in an adding machine by a simple method. Certain features disclosed herein are covered in my pending application, Serial No. 552,608, filed April 14, 1922.

The well-known Underwood-Hanson adding and subtracting or "bookkeeping" machine is employed in illustrating the invention, and certain modifications are made in the mechanism in order to enable it to perform the new operation.

A need for the invention has arisen in connection with making out water and gas bills. There is typed upon the bill a certain number of cubic feet, to represent the present reading of the gas meter; and automatically this number is run into a main register. There is then typed upon the bill a certain number of cubic feet to represent the former reading of the gas meter. Automatically this second amount is also entered in said main register, which then discloses the difference between the two amounts that have been entered therein. This difference is then typed upon the bill, to show the number of cubic feet charged to the customer. This same difference is also used as a multiplicand, for the purpose of the present invention.

Among the uses for which the present invention is intended, is the making out of such bills where the rate is 90¢ per thousand cubic feet; and for this purpose the adding machine is made to disclose the product of the number of thousands of consumed cubic feet by .90.

In other words, a separate or auxiliary register is caused automatically to show an amount which equals nine-tenths of said multiplicand. The first thing accomplished by said auxiliary register, is to ascertain automatically an amount which shall equal one-tenth of said multiplicand. Then by a simple subtraction operation in said auxiliary register, the difference is ascertained between said one-tenth and the full amount of ten-tenths. This difference, or nine-tenths, equals the multiplicand multiplied by .90.

The auxiliary register and the main register are connected to operate simultaneously, so that when the new reading of the gas meter is entered in the main register, ten per cent thereof is entered in the auxiliary register. When the old reading is typed and entered in the main register, ten per cent thereof is also entered in the auxiliary register. The latter therefore ascertains and shows ten per cent of the difference between the new reading and old reading of the gas meter. It will be remembered that said difference appears in the main register, and constitutes a multiplicand in the ensuing computation.

The co-operation between the two registers is then automatically altered temporarily, so that when said difference (or multiplicand) is subtracted out of the main register, an amount exactly equal to said difference is run into the auxiliary register, which then discloses the difference between said difference (or said multiplicand) and the previously-ascertained ten per cent thereof. In other words, the auxiliary register now discloses ninety per cent of the multiplicand.

When, for example, 25,500 is entered in the main register as the present reading of the gas meter, the amount of —2,550 is automatically entered in the auxiliary register. Then when the old meter reading of 12,300, for example, is subtracted in the main register, an amount of +1230 is entered in the auxiliary register. Therefore, when the main register shows a difference of 13,200 cubic feet, the auxiliary register exhibits a difference of —1320.

At this stage the main register is cleared, and this is done by typing the amount 13,200 on the bill and at the same time subtracting it out of the main register, to bring the latter to "0". During this operation the full amount of the multiplicand, +13,200, is automatically entered in the auxiliary register, which is caused to disclose the difference between ten-tenths and one-tenth of 13,200, or 11,880. The right-hand figure of this amount is disregarded, and it is read as $11.88. Thus the product of the cubic feet of consumed gas (13,200) by the thousand-foot rate of $.90, is automatically secured, namely $11.88.

To go back a step to the point at which the amount of one-tenth stands in the auxiliary register, it will be understood that this one-tenth must be deducted from the ten-tenths during the running of the latter amount into the auxiliary register. The most convenient way to handle this condition, is to have the numbers run reversely upon the dials in the auxiliary register. Hence the first number showing upon said dials would be in the nature of the complement of 2550. The next number appearing thereon would be the complement of the difference between 2550 and 1230. Hence when 13,200 is finally added into said auxiliary register, the amount finally disclosed thereby is 11,880, which equals 13,200 less 1320. It will be remembered that the complement of the latter amount was disclosed in the register just before 13,200 was run thereinto.

In other words, it is desired that the difference that is first ascertained by the auxiliary register shall exist therein in the form of a minus quantity, and it is for this reason that the numbers on its dials are in reverse order. It will be seen that since the auxiliary register just before the final operation contains a minus one-tenth, the result of the adding of plus ten-tenths will be to produce plus nine-tenths, which is the desired result.

The invention is also in modified form applicable to machines in which the rate per thousand cubic feet is $1.10. In that case the numbers on the auxiliary dials will run in their regular order. The auxiliary register will therefore ascertain one-tenth, or 1320. This may be added to the ten-tenths, or 13,200, giving 14,520, thus denoting the product of $14.52, or 13,200 cubic feet at $1.10 per thousand.

Other features and advantages will hereinafter appear.

In the accompanying drawings,

Figure 1 is a diagram illustrating a gas or water bill with new and old meter readings typed thereon, also the consumption of the water or gas, i. e., the difference between said readings. There is also shown the product of multiplying the consumed cubic feet by .90 per 1000 ft. With this bill is a diagram illustrative of the steps of operation in the main and auxiliary registers (Reg. 2 and Reg. 3). There is also shown a register (Reg. 1) which may be used merely to accumulate the totals of successive bills. In this diagram, one column indicates the operations in the first register, the second column illustrates the operations in the second register, and the third column indicates those in the third register.

Figure 2 is a diagrammatic plan of an Underwood bookkeeping machine, showing a gas bill in place upon the platen, and illustrating the automatic operation of the computing mechanism as the bills are typed. There is also illustrated the keyboard of said machine, showing type-keys, tabulating keys, register dials and the usual clearance or "star" keys.

Figure 3 is a diagram in rear elevation of the usual vertical thrust rods of the second or main register forming a regular set.

Figure 4 is a similar diagram of the special set of thrust rods for the auxiliary or third register, showing one thrust rod disregarded, and also showing a forking of the tens of cents thrust rod, for reasons which will hereinafter appear.

When a bill 10 is inserted around the platen 11 of said Underwood bookkeeping machine 12, the numeral type keys 13 are operated to type thereon the present state of the gas meter, as, for example, 25,500, and the number 25,500 is automatically run into the main (second) register 14. At the same time ten per cent of this amount, or 2,550, is negatively entered into the auxiliary (No. 3) register 15. The latter, it will be understood, has reversed dials, and hence shows the complement of 2,550, or 97,450, which reading it is not necessary for the operator to consider. (The means whereby 2,550 is run into the auxiliary register while 25,500 is run into the main register, will presently be explained.) Thus one-tenth of the quantity added in the main register is subtracted in the auxiliary register. It will be understood that when the dial for tens of thousands is operated in register 14, the thousands dial is simultaneously operated in register 15, but that this thousands dial is to be read as tens of dollars; and so on.

The old reading of the gas meter, 12,300, is then typed in the appropriate column on the bill, the machine first having been shifted to subtraction condition, so that in the main register 14 this amount of 12,300 is subtracted from 25,500, showing a net consumption of 13,200 cubic feet. At the same time ten per cent of 12,300, or 1230, is automatically added into the auxiliary register 15, thereby reducing the minus quantity therein to 1,320, which is ten per cent of the net consumption 13,200. In other words, the main register now shows a difference amounting to 13,200, while the auxiliary register stands with ten per cent of it, or has a minus quantity of 1,320 therein, the dials showing the complement of 1,320, or 98,680. This need not be considered by the operator.

Thereupon the consumption of cubic feet 13,200, which shows in the main register 14, is typed in the consumption column on the bill, and automatically subtracted out of said main register to clear the latter, while at the same time there is automatically entered into the auxiliary register 15 one hundred per cent of 13,200, which is therefore made to show the difference between 13,200 and 1320, or 11,880, which is nine-tenths of 13,200.

In order to avoid mental calculations and to use the auxiliary register practically, the units dial thereon is covered by a screen 16, so that said register shows 1188, which is read as $11.88, which is the result of multiplying the consumed cubic feet 13,200, by the price, .90 per thousand feet. The product 11.88 is then typed in the last column on the bill, and simultaneously added in register 17, and at the same operation register 15 is cleared. Then registers 14 and 15 show "0," while the first register shows $11.88. The latter is also provided with a units-wheel screen 18. The registers have the usual star-printing keys 19, to prove clearance.

Viewed in another way, it will be seen that when the new meter-reading 25,500 is typed, the full amount is set up, to be run into register 14, while one-tenth of the full amount is also set up to be run into register 15 negatively; and that when the old reading 12,300 is typed, it is subtracted out of register 14, and one-tenth of it is set up to be run into the auxiliary or product register 15, to be added therein as a positive amount. Thus there remains in the auxiliary or product register an amount equal to one-tenth of the 13,200 consumed cubic feet, or, in other words, one-tenth of the difference between the new reading and the old reading. When the actual consumption is then typed in the appropriate column on the bill, the number 13,200 is set up to be run into the auxiliary or product register 15 at the same time that it is subtracted from main register 14. This full amount 13,200 is run into the auxiliary or product register 15 as a positive quantity, because of the reverse reading of its dials. This quantity 13,200 represents ten-tenths, and when added to the negative one-tenth in the auxiliary register 15 shows nine-tenths of 13,200 or 11,880.

The manner of operating the auxiliary or product register 15 will now be explained. In said Underwood-Hanson bookkeeping machine are denomination-selecting jacks, which are depressed seriatim by the typewriter carriage 20 when the latter moves through the computing zone, during which motion the numbers are typed that are to be computed. On the carriage are dogs 21, 22, 23, 24, 25, 26, 27 and 28 at proper locations for operating these jacks. In the present instance, while one dog (e. g., 21) is operating the jacks 29 for the main register 14, another dog (e. g., 23) is operating the jacks 30 for register 15. The dogs are illustrated diagrammatically as of various lengths, whereby each dog will co-operate only with its own predetermined set of jacks; the dog 24 which is to operate the jacks 31 for register 17, for example, being too short to reach either the jacks 29 of register 14 or the jacks 30 of register 15; while the dogs 21, 22, 23, which are intended for register 14, are too short to reach register 15. Selection of co-operative registers by dogs is well known in said Underwood machine.

In the present construction, when one dog (21 or 22 or 25) is co-operating with the jacks 29 for register 14, another dog (23 or 26 or 27) is co-operating with the jacks 30 for register 15, but of the last-mentioned dogs those marked 23 and 26 are each displaced one point, or one denominational space, so that, when the dog 21 or 22 is co-operating with the thousands jack in the set 29, the co-operative dog 23 or 26 is co-operating with the hundreds jack in the set 30. Hence when "5" is added in the thousands place in register 14, the same amount is entered in the hundreds place in register 15. In these instances the auxiliary register 15 is made to set up one-tenth of the amount that is set up in register 14, and hence to ascertain one-tenth of the difference which is computed by register 14. The natural position which said dogs 23 and 26 would ordinarily occupy in an adding machine, is indicated by dotted lines in Figure 2; the purpose of this displacement as just explained being to enter into register 15 amounts equal to ten per cent of certain of the amounts that are entered in register 14.

The third dog 27 for auxiliary register 15, however, is in its natural position at Figure 2, so that by the co-operation thereof the full amount is to be entered in the auxiliary or product register that is subtracted from the main register 14 at its clearing operation. By this means the subtraction of ten per cent from the full amount is automatically secured in the auxiliary register 15, as, for example, at Figure 1 the subtraction of 1320 from 13,200, leaving 11,880 showing in register 15.

The fourth dog 27 for operating register 15 is used for the purpose of clearing said register, while the shortest dog 24 at Figure 2 enters the same digits in register 17. Figure 2 is a mere diagram to illustrate the method of operation, and will be understood by those who are accustomed to setting different dogs to different positions along the carriage 20.

At Figure 2 the numbers in the circles indicate the respective registers affected by the various dogs at different operations. The numbers in the squares indicate which dogs are employed for each operation; these numbered squares corresponding with the columns marked "1", "2", "3" and "4" on the bill 10 at Figure 1.

To prove that the register 14 has been cleared after subtracting 13,200, the star-key 19 associated with said register may be operated. Similarly the star-key 19 associated with register 15 may be operated after clearing the latter. It has already been explained that since register 15 is provided with reversed dials, the numbers exhibited thereby are complements of those above mentioned in connection with register 15, except the disclosed product of 1188, which is actually exhibited by said register, after the computation is completed.

In said Underwood machine, it is customary to make separate groups of the digits which make up a number, by leaving spaces between the hundreds and thousands places, and also between the hundreds of thousands and millions places, and also between the units place and the first decimal place; and in practicing the present invention it is preferred to have such appropriate spacing of the typing on the work-sheet. This spacing it is desired to secure both when the product register 15 is being operated to show ten per cent of the difference ascertained by register 14, and also when register 15 is being caused to receive the same number that is being finally subtracted from register 14. In other words, a spacing to represent the decimal point is desired both when the register 15 is being controlled by its first two dogs 23 and 26 for ten per cent computation, and also by its final two dogs 27 and 28 for one hundred per cent computation. This result is secured in set 30 practically by making the dial-driving bar (not shown) for the .1 place (i. e., the 10¢ bar) controllable by dogs in either of two denominational places. Dogs 23 and 26 can operate or control the 10¢ bar in the .1 position, while dogs 27 and 28 can operate said bar in the .1 position. For this purpose, the thrust-rod 32, which forms a connection between its jack 30 and the 10¢ dial-driving bar, is made with a fork or branch 33. Preferably, the top of said thrust-rod 32 is branched, to be controllable or operable by either of two jacks. These thrust-rods, which are generally designated as 34 and 35 at Figures 3 and 4, are affected by the movements of the jacks 29, 30 and 31 to actuate the usual transposition mechanism (not shown), so that each jack may cooperate with its appropriate dial-driving bar.

It will thus be seen that the various amounts may be set up in register 15, because of this denominational off-setting, since provision is made whereby the denomination-selecting mechanism of the tens of cents dial-operating bar may be operated in two adjoining letter-space positions ot the typewriter carriage 20; and that it is for this purpose that the thrust-rod 32 associated with tens of cents is provided with the forks. To illustrate the operation of this rod 32, let it be assumed that the first entry, or old reading (25,500), is to be made. The carriage is tabulated to the tens of thousands position, thus causing the selector-dog 21 of register 14 to displace the tens of thousands rod in set 35, and the selector-dog 23 of register 15 to depress the rod in set 34 which is used for units of dollars in set 34. The "2" is then typed; and the carriage 20 feeds a step, thus causing the thousands rod to be displaced in the set 35 belonging to register 14, and the selector-dog 23 of register 15 engages the first branch 33 of tens of cents rod 32. The "5" is then typed, and set up on the "thousands" rod in set 35 and the "tens of cents" rod in set 34. The carriage 20 then feeds another step, to the punctuation position; and at this time there may be operated by the selector-dog 21 of register 14 the usual key-lock (not shown). The selector-dog 23 of register 15 at the same time advances to the main portion of the tens of cents thrust-rod 32, thus displacing said tens of cents rod, and advancing the dial-driving bar thereof to its pin-setting position but without any effect, this being merely an idle operation, because said driving bar for 32 is protected against the accidental setting of an indexing pin thereon at this time, by reason of the setting of the key-lock by said selector dog 22 of register 14. The carriage 20 may then be fed by the usual space-bar, or by the usual comma key, to make the punctuation space on the work-sheet 10. During this feed of the carriage, the hundreds thrust-rod of set 35 is displaced by the selector-dog 21, and the units of cents thrust-rod in the set 34 of register 15 is operated by its associated selector-dog 23. The "5" key 13 may then be typed, thus completing the setting up of indexing pins for register 15. The zeros forming the remainder of the number may then be typed. When the old reading (12,300) is thereupon typed and set up, the operation of the thrust-rods and the dial-driving bars is the same as that just described.

Since the selector-dog 27 associated with register 15 in typing column 3 is not offset, the operation of said dog is as follows: The carriage 20 is tabulated to the tens of thousands position, displacing the tens of thousands thrust-rod and its dial-driving bar in register 14 and the bar which is used for tens of dollars in register 15. The "1" key 13 is then depressed, and the carriage 20 feeds a step, causing the displacement of the thousands thrust-rod and dial-bar in set 35 for register 14, and also of the units of dollars bar in set 34 for register 15. The carriage may then be fed to punctuation position, and the key-lock is operated in connection with register 14 by its associated selector 22, and the selector-dog 27 of register 15 engages the other branch of the tens of cents thrust-rod 32, thus displacing the tens of cents computing bar idly, since the numeral-keys are locked. Then the punctuation mark is typed, and the carriage feeds, causing the depression of the hundreds thrust-rod for register 14, while the selector of register 15 advances to the second branch of the tens of cents thrust-rod 32. The "2" may then be typed, after which the carriage is fed, causing the depression of the tens thrust-rod for register 14 and the units of cents thrust-rod for register 15.

From the foregoing it will be understood that the tens of cents thrust-rod 32, or the denomination-selecting device, occupies two letter-space or denominational positions, and that, according to the setting of the selectors of register 15 on the carriage 20 with respect to the selectors of register 14, the tens of cents rod 32 may be operated early or late within the double letter-space position of the carriage 20.

At Figure 2 is indicated the tabulating mechanism, comprising a set of keys 36 to tabulate the carriage for typing the bill, these keys showing in the upper row denominational designations 37 for use with the main register 14, and in the lower row designations for use with the auxiliary register 15 when the latter is to be cleared by subtracting therefrom the product shown therein, at the same time adding it into the register 17.

The typewriter carriage may be provided with the usual tabulating mechanism, which usually includes column stops (not shown) and decimal-stops controlled by the decimal-selecting keys 36. The decimal keys may have two systems of notations or designations thereon. The top row of designations is used in connection with the main register 14, that is, when typing in either column 1, column 2 or column 3 on the bill. When typing in column 4, the lower designations upon the keys 36 may be used. The lower designations relate to money. The decimal-stop key that is used for $10 is the same one that is used for 10,000 cubic feet when typing in the other columns, for example. The top row of designations, reading from right to left, comprises millions, hundreds of thousands, tens of thousands, thousands, punctuation space, hundreds, tens and units. The bottom row of designations comprises thousands of dollars, hundreds of dollars, tens of dollars, units of dollars, decimal point, dimes and cents; the last key on the left hand not being used in connection with register 15 or register 17. The fourth denomination-selecting key 36 is used both for the decimal point in the lower row of designations, and the punctuation space between hundreds and thousands in the upper row of designations.

Variations may be resorted to within the scope of the invention, and portions of the improvements may be used without others.

Having thus described my invention, I claim:

1. An adding and subtracting machine comprising number-keys, a main register upon which to compute the multiplicand and an auxiliary register whose direction of numbering is reversed, means to operate said registers denomination by denomination in unison by the aid of the number-keys, and a carriage to co-operate denominationally with the registers and controlled by the number-keys; means being provided whereby the amounts entered in the auxiliary register are one-tenth of those entered in the main register during the computation of the multiplicand in the latter, and whereby the amount entered in the auxiliary register is ten-tenths of that entered in the main register when subtracting the multiplicand from the latter to return it to zero, whereby the auxiliary register is made to contain nine-tenths of said multiplicand.

2. An adding and subtracting machine comprising number-keys, a main register upon which to compute the multiplicand and an auxiliary register whose direction of numbering is reversed, means to operate said registers denomination by denomination in unison by the aid of the number-keys, and a carriage to co-operate denominationally with the registers and controlled by the number-keys; means being provided whereby the amounts entered in the auxiliary register are one-tenth of those entered in the main register during the computation of the multiplicand in the latter, and whereby the amount entered in the auxiliary register is ten-tenths of that entered in the main register when subtracting the multiplicand from the latter to return it to zero, whereby the auxiliary register is made to contain nine-tenths of said multiplicand, said registers having dials, and means being provided to cover the units dial of the auxiliary register.

3. An adding and subtracting machine comprising a main register upon which to ascertain a multiplicand by an operation of subtraction, an auxiliary register having its numbers run in reverse order and connected to operate at the same time as the main register, and means for causing said auxiliary register automatically to register an amount which equals nine-tenths of the multiplicand.

4. An adding and subtracting machine comprising a main register upon which to ascertain a multiplicand by an operation of subtraction, an auxiliary register having its numbers run in reverse order and connected to operate at the same time as the main register, means for causing said auxiliary register automatically to register an amount which equals one-tenth of the multiplicand, and means for automatically running an amount equal to said multiplicand into said auxiliary register, to cause the latter to show the difference between one-tenth and ten-tenths of said multiplicand.

5. The combination with a main register, of means to co-operate with said register to ascertain the difference between certain amounts entered therein, an auxiliary register, and means for automatically causing said auxiliary register to ascertain nine-tenths of said difference.

6. The combination with a main register, of means to co-operate with said register to ascertain the difference between certain amounts entered therein, an auxiliary register, and means for automatically causing said auxiliary register to ascertain eleven-tenths of said difference.

7. The combination with a main register and numeral type keys co-operative therewith, of means to co-operate with said register to ascertain the difference between certain amounts entered therein, an auxiliary register, means for causing said auxiliary register to ascertain one-tenth of said difference, and means co-operating with said registers to be effective at the subtraction of said difference out of said main register, to cause said auxiliary register to ascertain or compute nine-tenths of said difference.

8. The combination with a main register, of means to co-operate with said register to ascertain the difference between certain amounts entered therein, and an auxiliary register which is connected to divide by ten the numbers entered into the main register, means being provided for causing the operation of the auxiliary register to be the reverse of that of the main register.

9. The combination with a main register, of means to co-operate with said register to ascertain the difference between certain amounts entered therein, an auxiliary register which is connected to divide by ten the numbers entered into the main register, means being provided for causing the operation of the auxiliary register to be the reverse of that of the main register, and means for causing the full amount of said difference to be entered into the auxiliary register when said difference is subtracted out of the main register to clear it.

10. The combination with a main register, of means to co-operate with said register to ascertain the difference between certain amounts entered therein, an auxiliary register which operates reversely with relation to the direction of operation of the main register, and means for automatically entering into the auxiliary register the full amount of said difference and also ten per cent of each of said certain amounts.

11. The combination with a main register and numeral type keys therefor, of means to co-operate with said register to ascertain the difference between certain amounts entered therein, an auxiliary register which is connected to divide by ten the numbers entered into the main register, means being provided for causing the operation of the auxiliary register to be the reverse of that of the main register, means for causing the full amount of said difference to be entered into the auxiliary register when said difference is subtracted out of the main register to clear it, and means for effecting the clearing of said auxiliary register concomitantly with the typing of the result shown by said auxiliary register.

12. The combination with a main register, of means to co-operate with said register to ascertain the difference between certain amounts entered therein, an auxiliary register which is connected to divide by ten the numbers entered into the main register, said registers comprising dials, and the numbers on the auxiliary dials running in the reverse order from those on the main dials, and means for causing the full amount of said difference to be entered automatically into the auxiliary register.

13. The combination with a main register, of means to co-operate with said register to ascertain the difference between certain amounts entered therein, an auxiliary register which is connected to divide by ten the numbers entered into the main register, said registers comprising dials, and the numbers on the auxiliary dials running in the reverse order from those on the main dials, and means for causing the full amount of said difference to be entered automatically into the auxiliary register when said difference is subtracted out of the main register.

14. The combination with a main dial-register capable of addition and subtraction, of an auxiliary dial-register, the dials on the auxiliary register running in the reverse order from those on the main register, and means for automatically entering into the auxiliary register the full amount of a certain number entered into the main register and ten per cent of other numbers entered into the main register.

15. The combination with a denomination-selecting carriage, of a subtraction main register, and an auxiliary register for computing 10 per cent of a difference ascertained in the main register, said carriage having means for selecting lower denominations in the auxiliary register than in the main register while said difference is being ascertained, said carriage also having means for selecting the same denominations in one register as in the other, so as to secure in the auxiliary register a result disagreeing by 10 per cent from the difference secured in the main register.

16. The combination with a denomination-selecting carriage, of a subtraction main register, and an auxiliary register for computing 10 per cent of a difference ascertained in the main register, said carriage having means for selecting lower denominations in the auxiliary register than in the main register while said difference is being ascertained, said carriage also having means for selecting the same denominations in one register as in the other, so as to secure in the auxiliary register a result 10 per cent less than the difference secured in the main register.

17. The combination with a denomination-selecting carriage, of a subtraction main register, and an auxiliary register for computing 10 per cent of a difference ascertained in the main register, said carriage having means for selecting lower denominations in the auxiliary register than in the main register while said difference is being ascertained, said carriage also having means for selecting the same denominations in one register as in the other so as to secure in the auxiliary register a result 10 per cent less than the difference secured in the main register, said carriage having a plurality of denomination-selecting dogs for each of said registers, including dogs which select the same denominations in the two registers simultaneously, and also dogs co-operative in running the full amount into the main register and 10 per cent of such amount into the auxiliary register, during the operation of ascertaining the difference between certain primary amounts in the main register.

18. The combination with a denomination-selecting carriage, of a subtraction main register, and an auxiliary register for computing 10 per cent of a difference ascertained in the main register, said carriage having means for selecting lower denominations in the auxiliary register than in the main register while said difference is being ascertained, said carriage also having means for selecting the same denominations in one register as in the other, so as to secure in the auxiliary register a result 10 per cent less than the difference secured in the main register, said carriage having a plurality of denomination-selecting dogs for each of said registers, including dogs which select the same denominations in the two registers simultaneously, and also dogs co-operative in running the full amount into the main register and 10 per cent of such amount into the auxiliary register, during the operation of ascertaining the difference between certain primary amounts in the main register, the 10 per cent dogs for the auxiliary register being each displaced to the extent of one denomination relatively to the dogs for the main register.

19. The combination with a denomination-selecting carriage, of a subtraction main register, an auxiliary register for computing 10 per cent of a difference ascertained in the main register, said carriage having means for selecting lower denominations in the auxiliary register than in the main register while said difference is being ascertained, said carriage also having means for selecting the same denominations in one register as in the other, so as to secure in the auxiliary register a result 10 per cent less than the difference secured in the main register, said carriage having a plurality of denomination-selecting dogs for each of said registers, including dogs which select the same denominations in the two registers simultaneously, and also dogs co-operative in running the full amount into the main register and 10 per cent of such amount into the auxiliary register, during the operation of ascertaining the difference between certain primary amounts in the main register, the 10 per cent dogs for the auxiliary register being each displaced to the extent of one denomination relatively to the dogs for the main register, and a third register to accumulate the totals of successive bills produced by the auxiliary register.

20. The combination with a denomination-selecting carriage, of a subtraction main register, and an auxiliary register for computing 10 per cent of a difference ascertained in the main register, said carriage having means for selecting lower denominations in the auxiliary register than in the main register while said difference is being ascertained, said carriage also having means for selecting the same demonimations in one register as in the other, so as to secure in the auxiliary register a result 10 per cent less than the difference secured in the main register, said carriage having a plurality of denomination-selecting dogs for each of said registers, including dogs which select the same denominations in the two registers simultaneously, and also dogs co-operative in running the full amount into the main register and 10 per cent of such amount into the auxiliary register, during the operation of ascertaining the difference between certain primary amounts in the main register, the 10 per cent dogs for the auxiliary register being each displaced to the extent of one denomination relatively to the dogs for the main register, said registers having dials, and the dials on the auxiliary register being provided with numbers which run in the reverse direction from those on the main register.

21. The combination with a denomination-selecting carriage, of a subtraction main register, and an auxiliary register for computing 10 per cent of a difference ascertained in the main register, said carriage having means for selecting lower denominations in the auxiliary register than in the main register while said difference is being ascertained, said carriage also having means for selecting the same denominations in one register as in the other, so as to secure in the auxiliary register a result 10 per cent less than the difference secured in the main register, said carriage having a plurality of denomination-selecting dogs for each of said registers, including dogs which select the same denominations in the two registers simultaneously, and also dogs co-operative in running the full amount into the main register and 10 per cent of such amount into the auxiliary register, during the operation of ascertaining the difference between certain primary amounts in the main register, the 10 per cent dogs for the auxiliary register being each displaced to the extent of one denomination relatively to the dogs for the main register, said registers having dials, and the dials on the auxiliary register being provided with numbers which run in the reverse direction from those on the main register, the units dial of said auxiliary register being covered by a screen.

22. The combination with a denomination-selecting carriage, of a subtraction main register, and an auxiliary register for computing 10 per cent of a difference ascertained in the main register, said carriage having means for selecting lower denominations in the auxiliary register than in the main register while said difference is being ascertained, said carriage also having means for selecting the same denominations in one register as in the other, so as to secure in the auxiliary register a result 10 per cent less than the difference secured in the main register, said carriage having a plurality of denomination-selecting dogs for each of said registers, including dogs which select the same denominations in the two registers simultaneously, and also dogs co-operative in running the full amount into the main register and 10 per cent of such amount into the auxiliary register, during the operation of ascertaining the difference between certain primary amounts in the main register, the 10 per cent dogs for the auxiliary register being each displaced to the extent of one denomination relatively to the dogs for the main register, said registers having dials, and the dials on the auxiliary register being provided with numbers which run in the reverse direction from those on the main register, said registers being divided into denominational groupings separated by key-locking devices, the auxiliary register comprising a 10-cent dial which is operable in either of two denominational positions of said carriage.

23. The combination with a denomination-selecting carriage, of a subtraction main register, and an auxiliary register for computing 10 per cent of a difference ascertained in the main register, said carriage having means for selecting lower denominations in the auxiliary register than in the main register while said difference is being ascertained, said carriage also having means for selecting the same denominations in one register as in the other, so as to secure in the auxiliary register a result 10 per cent less than the difference secured in the main register, said carriage having a plurality of denomination-selecting dogs for each of said registers, including dogs which select the same denominations in the two registers simultaneously, and also dogs co-operative in running the full amount into the main register and 10 per cent of such amount into the auxiliary register, during the operation of ascertaining the difference between certain primary amounts in the main register, the 10 per cent dogs for the auxiliary register being each displaced to the extent of one denomination relatively to the dogs for the main register, said registers having dials, and the dials on the auxiliary register being provided with numbers which run in the reverse direction from those on the main register, said registers being divided into denominational groupings separated by key-locking devices, the auxiliary register comprising a 10-cent dial which is operable in either of two denominational positions of said carriage, said 10-cent dial having a forked connection to enable it to be used for computation in either of two denominational positions of the carriage.

24. The combination with a denomination-selecting carriage, of a subtraction main register, and an auxiliary register for computing 10 per cent of a difference ascertained in the main register, said carriage having means for selecting lower denominations in the auxiliary register than in the main register while said difference is being ascertained, said carriage also having means for selecting the same denominations in one register as in the other, so as to secure in the auxiliary register a result 10 per cent less than the difference secured in the main register, the dial for tens of cents in said auxiliary register being controllable by a member which is constructed to occupy two denominational positions, so that, according to the setting of the selectors of the auxiliary register on the carriage with respect to the selectors of the main register, the tens of cents dial may be operated either early or late within the double letter-space position of the carriage.

25. The combination with a letter-feeding carriage and two registers, of denominational jacks for the registers, selecting dogs to co-operate with the jacks at the carriage movements, one dog co-operative with one set of jacks while another dog is co-operative with another set of jacks, the last-mentioned dog being displaced one point to a lower denomination, and a second dog for the auxiliary register to co-operate with jacks of the same denomination as are selected by the dog for the main register.

26. The combination with a letter-feeding carriage and two registers, of denominational jacks for the registers, selecting dogs to co-operate with the jacks at the carriage movements, one dog co-operative with one set of jacks while another dog is co-operative with another set of jacks, the last-mentioned dog being displaced one point to a lower denomination, a second dog for the auxiliary register to co-operate with jacks of the same denomination as are selected by the dog for the main register, an additional dog for the auxiliary register, an accumulative register, and a dog for simultaneously co-operating with the accumulative register.

27. The combination with a letter-feeding carriage and a computing mechanism including two registers, of denominational jacks for the registers, selecting dogs to co-operate with the jacks at the carriage movements, one dog co-operative with one set of jacks while another dog is co-operative with another set of jacks, the last-mentioned dog being displaced one point to a lower denomination, and a second dog for the auxiliary register to co-operate with jacks of the same denomination as are selected by the dog for the main register, said computing mechanism constructed to subtract in the main and auxiliary registers, and the dials of the auxiliary register having the numbers run in the reverse direction.

28. In a combined typewriting and computing machine having a letter-feeding carriage, the combination with type-operating keys, and computation mechanism including a main register and an auxiliary register controlled thereby, said registers comprising dials and dial-controlling trains, of denomination-selecting dogs to co-operate with the carriage to effect one hundred per cent computation in both registers simultaneously, and ten per cent computation in one register of amounts ascertained by the other register, said computation mechanism leaving a space for the decimal point on the work-sheet, the dial train for the .1 place in the auxiliary register being controllable by dogs in either of two denominational places.

29. In a combined typewriting and computing machine having a letter-feeding carriage, the combination with type-operating keys, and computation mechanism including a main register and an auxiliary register controlled thereby, said registers comprising dials and dial-controlling trains, of denomination-selecting dogs to co-operate with the carriage to effect one hundred per cent computation in both registers simultaneously, and ten per cent computation in one register of amounts ascertained by the other register, said computation mechanism leaving a space for the decimal point on the work-sheet, the dial train for the .1 place in the auxiliary register being controllable by dogs in either of two denominational places, each of said registers having a set of jacks and separate thrust rods controlled thereby, the thrust rod for the .1 place in one register mechanism having means to be operated in either of two successive letter-space positions of the typewriter carriage.

30. In a combined typewriting and computing machine, the combination with a carriage provided with tabulating mechanism including a set of denomination-selecting keys, of computing mechanism including a main register in which to ascertain the difference between old and new readings, and also including a product register to show in dollars the quantity multiplied by the rate, said tabulating keys having an upper row of designations thereon for use with the main register, and also having a lower row of designations thereon for use with the product register.

31. In a combined typewriting and computing machine, the combination with a carriage provided with tabulating mechanism including a set of denomination-selecting keys, of computing mechanism including a main register in which to ascertain the difference between old and new readings, and also including a product register to show in dollars the quantity multiplied by the rate, said tabulating keys having an upper row of designations thereon for use with the main register, and also having a lower row of designations thereon for use with the product register, the designations in the lower row having monetary signs.

32. In a combined typewriting and computing machine, the combination with a carriage provided with tabulating mechanism including a set of denomination-selecting keys, of computing mechanism including a main register in which to ascertain the difference between old and new readings, and also including a product register to show in dollars the quantity multiplied by the rate, said tabulating keys having an upper row of designations thereon for use with the main register, and also having a lower row of designations thereon for use with the product register, the designations in the lower row having monetary signs, and the same denomination key being used for both the decimal point in the lower row and the space between hundreds and thousands in the upper row.

WALTER E. TORFS.

Witnesses:
 EDITH B. LIBBEY,
 JENNIE P. THORNE.